Jan. 4, 1949.  W. C. MacKENZIE  2,458,477
COUPLING FOR WATER HOSE AND THE LIKE
Filed May 29, 1946  2 Sheets-Sheet 1
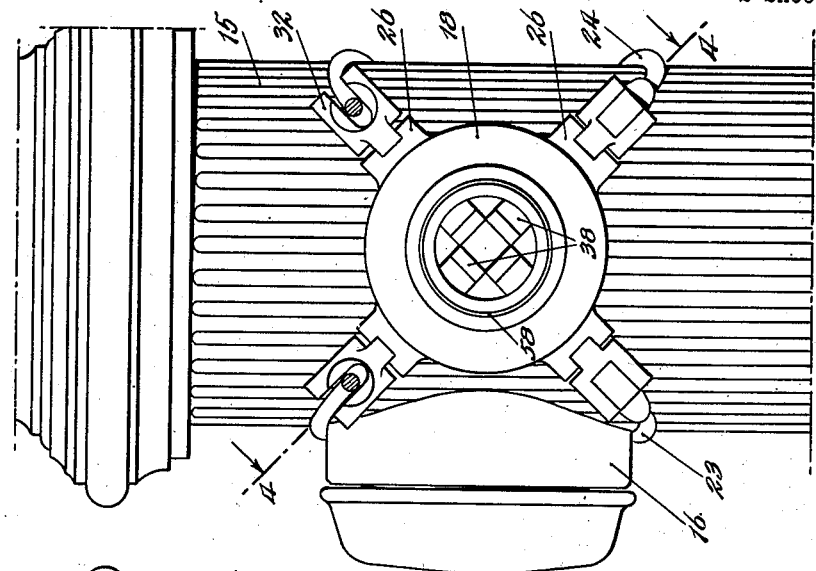
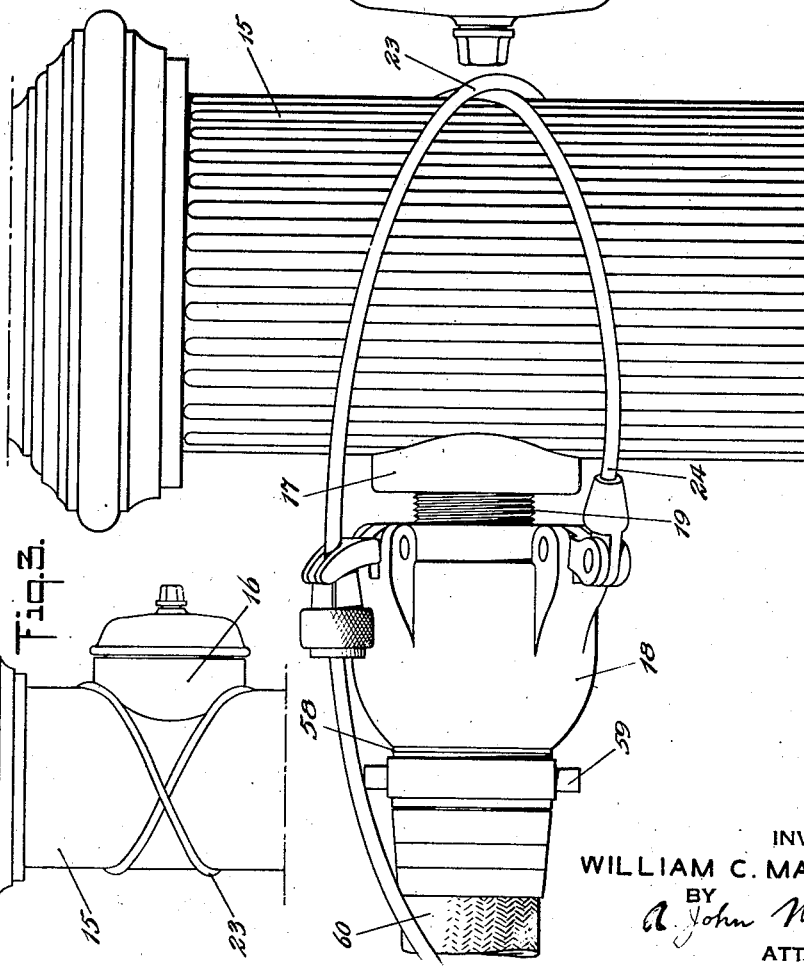
INVENTOR
WILLIAM C. MACKENZIE
BY
A. John Michel
ATTORNEY

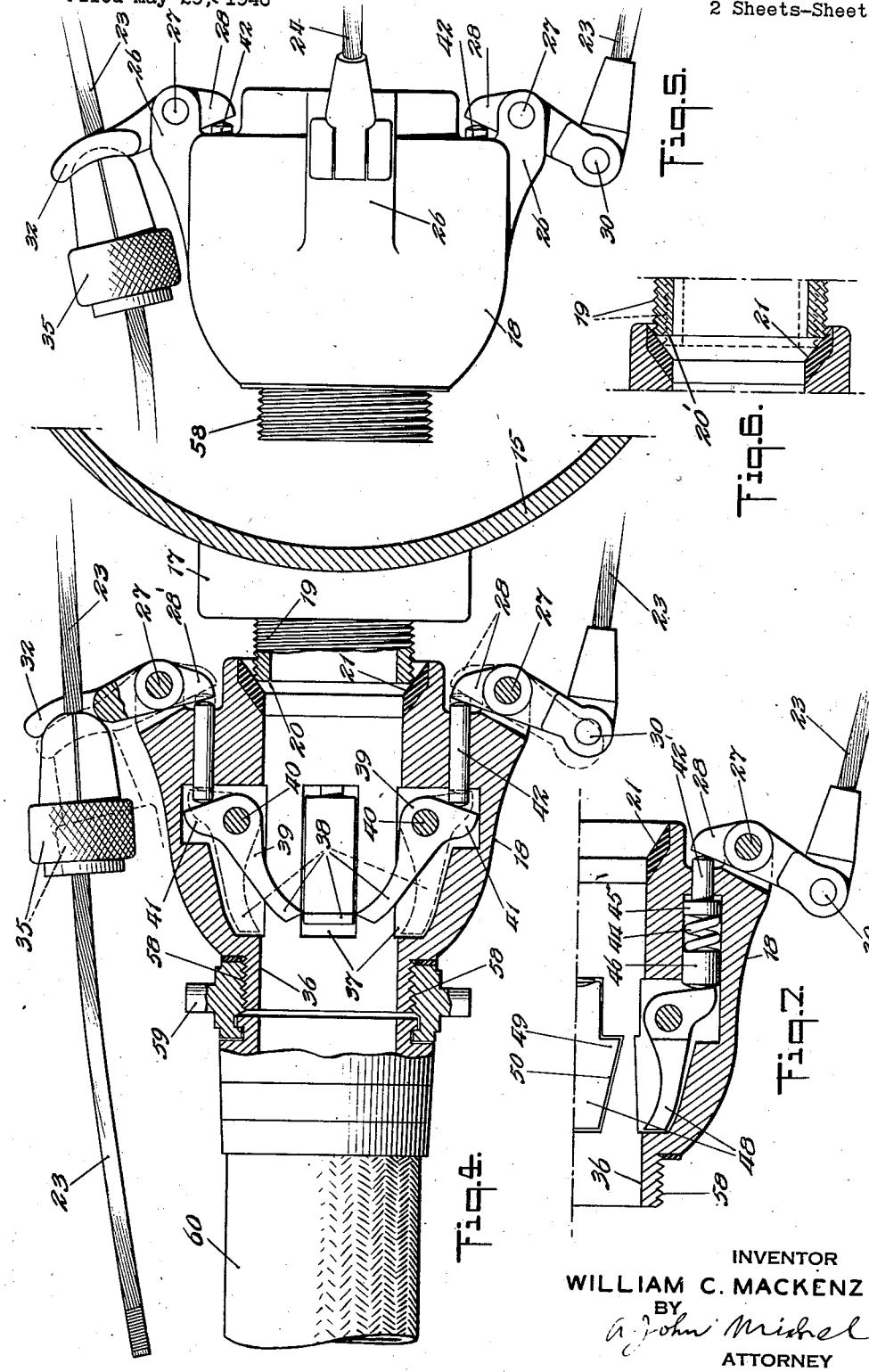

Patented Jan. 4, 1949

2,458,477

UNITED STATES PATENT OFFICE 2,458,477

COUPLING FOR WATER HOSE AND THE LIKE

William C. MacKenzie, New York, N. Y.

Application May 29, 1946, Serial No. 672,940

15 Claims. (Cl. 285—1)

This invention relates to couplings for connecting conduits to outlets for fluids under pressure, and more particularly to devices of this character for connecting fire hose to hydrants.

With the customary threaded couplings for connecting fire hose to hydrants, the threads on either the hydrant or the coupling may become damaged, rendering it difficult, if not impossible, to make the connection. Also, the available hydrant may have a different thread from the coupling, or a different diameter, thus making it necessary to provide as many different adapters as there are different threads and different diameters likely to be encountered. Even without these difficulties the turning of the coupling with the necessary wrench to tighten the threads consumes an appreciable increment of precious time.

An object of the present invention is therefore to provide a coupling which can be applied interchangeably to outlets of various diameters and conditions of threads.

A further object of this invention is to provide a self-tightening coupling which can be very rapidly applied in operative condition to a fire hydrant outlet.

Further objects are to provide means responsive to the velocity of the fluid in the conduit for automatically tightening the connection of the coupling on to the outlet.

Other objects, advantages and features of novelty will be apparent as the following description proceeds, with reference to the accompanying drawing, in which:

Fig. 1 is a side elevation of a fire hydrant showing the hose and hose coupling of the present invention applied thereto;

Fig. 2 is a front elevation of Fig. 1 with the hose removed;

Fig. 3 is a rear view of Fig. 2;

Fig. 4 is a longitudinal section taken along line 4—4 of Fig. 2;

Fig. 5 is a side elevation of the coupling;

Fig. 6 is a detail view illustrating the adaptability of the coupling to various sizes of hydrant outlet and pipes;

Fig. 7 is a partial longitudinal section of a modified form of the invention.

The drawings illustrate a hydrant 15 that is conventional for fighting fires, the hydrant 15 of the disclosed embodiment comprising a large outlet 16 and a smaller outlet 17. The coupling 18 according to the present invention is shown for example as connected to the smaller outlet 17. The outlet 17 is provided with the customary screw threads 19 and terminates in a rim 20, Fig. 4. The coupling 18 is provided with a ring 21 companion to the terminal rim 20 of the outlet 17, the ring 21 under preferred practice comprising a gasket or washer 21 of rubber, lead, synthetic plastic, or other suitable yielding or compressible material. The ring 21 is preferably cupped or conical in shape and is extended radially to fit different sized rims interchangeably within a range of sizes or threads, such for example as the rim 20' of larger diameter shown in Fig. 6.

A connection is provided between the coupling 18 and the outlet 17, the connection being attachable quickly exteriorly, and being operable to hold the ring 21 in position for registry with the rim 20 of the outlet 17. The connection of the disclosed embodiment is flexible, and this enables it to be passed around the barrel of the hydrant. The connection comprises the cable or the like 23 that is attached at its ends to the coupling 18, the attachements being positioned at transversely opposite points of the coupling. In the form shown in Fig. 1, there are two such cables 23 and 24 which cross each other, and these are disposed substantially at 90° with reference to each other. It will be appreciated, however, that instead of crossing each other, the cables may be arranged parallel to each other and parallel to the periphery of a cross-section through the barrel of the hydrant. These cables form a part of the automatic coupling device which is adapted to be tightened by the flow of fluid flowing out of the outlet to which the coupling is connected.

Four brackets or clevis-like members 26 are carried by the coupling 18 at points opposite each other peripherally of the hose coupling. Each clevis 26 provides a pivot 27 for a lever 28 or 28'. One arm of each lever 28 is secured to one end of a cable 23 or 24, the cable being extended therefrom around the barrel of the hydrant 15. At its other end the cable 23 or 24 passes through the forked arm 32 of lever 28' that is disposed transversely opposite the lever 28 to which its cable is attached. The levers 28' are also pivoted each on a clevis 26. The ends of the cables 23 and 24 for which levers 28' serve as attachments are provided each with a split setting knob 35 which serves as an adjustable abutment stop for the cable against the fork 32 after the cable has been drawn up tight.

The coupling 18 comprises the duct or conduit 36 that passes through the ring 21 and extends therebeyond through the coupling. When the coupling 18 is fastened to the outlet 17 by means of the connections 23 and 24 in the manner described hereinbefore, the coupling thus being positioned for its ring 21 to register with the rim 20 of the outlet 17, fluid from the outlet passes through the ring 21 and through the duct 36 of the coupling 18. One or more vanes 38 are disposed in the duct 36 in position to be actuated by fluid flowing therethrough, and the vanes 38 thereby operate to press the ring 21 into firm seating engagement with the rim 20. Pursuant to the purpose, each vane 38 is constructed to comprise an arm of a bell-crank lever 39 that is pivoted at 40, the other arm 41 thereof being disposed as shown to actuate a lever 28 or 28' through the intermediate push rod 42. The drive is reversible, and levers 39 are adapted to be actuated in their reverse directions by the levers 28 and 28'.

Under practice of the embodiment disclosed, there is a vane provided companion to each lever 28 and 28', and the vanes 38 are disposed in the duct 36 at points transversely opposite each other as shown. This positions the vanes symmetrical to be actuated uniformly and to apply balanced tensioning stresses to the cables 23 and 24 at symmetrically positioned levers 28 and 28'. The pull by the cables 23 and 24 is distributed uniformly around the coupling 18, and the pressure of the ring 21 against the rim 20 is distributed uniformly circumferentially.

The operation of fastening the coupling 18 to the outlet 17 by means of the cables 23 and 24, including the operation of sliding the split knobs 35 along the cables to take up slack, operates to actuate the levers 28 in counter-clockwise direction in Fig. 4, and the levers 28' in the clockwise direction, and this operates through push rods 42 to actuate the levers 39 to position the vanes 38 in the path of the fluid through the duct 36. The vanes 38 are thus positioned for actuation by the fluid to provide the desired pressure to seat the ring on the rim 20. The duct 36 is provided with a recess 37 for each vane 38 into which it is actuated by the flowing fluid, and by means of this construction the vanes 38 are positioned out of bounds of the duct 36 and out of the path of the fluid flowing through the duct in the normally intended operation of the hydrant 17. This avoids unnecessary resistance to the flow of fluid.

In accordance with the modified embodiment of the invention which is shown in Fig. 7, the push rods 42' are made in two pieces held apart by coiled compression springs 44 interposed between collars 45 and 46 on the respective pieces of the rods 42'. The springs 44 serve to distribute and equalize the pressure exerted by the vanes 38, and also to yield to prevent excessive pressure from being applied to the gasket 21 and cables 23 and 24 in cases where the fluid pressure is high and/or all the slack in the cables has been taken up.

The springs 44 provide a lost-motion for the vanes 38 enabling them to be moved out of the path of the fluid and into recesses 37 beyond the extent of their movements required to press the ring 21 into firm seating engagement with the rim 20.

The vanes 48 shown in Fig. 7 are constructed to extend more nearly continuously circumferentially of the duct 36 when they are positioned in the path of the flowing fluid, to thereby present greater surface area to action of the fluid. The vanes 48 are wider at their bases 49 for greater area of fluid impact and have tapered sides 50 in order to clear adjacent vanes in their movements relative to each other.

While in the embodiment shown in Figs. 4 and 5 there are provided four vanes, it is clear that a greater or smaller number could be used without departing from the principles of this invention.

The outer end of the coupling is shown as provided with a threaded nipple 58 which receives the standard coupling 59 of the conventional fire hose 60.

From the foregoing description it will be readily apparent that the coupling 18 according to the present invention means of the ring 21 is interchangeably adaptable to outlet rims 20 of various diameters and conditions of threads.

To attach the coupling to a hydrant 15 it suffices to merely pass cables 23 and 24 around the barrel of the hydrant and through the forked ends 32 of the levers 28', and to draw the cables tightly through the split knobs 35. The hydrant is then turned on in the usual manner, and the force of the fluid passing through the bore or duct 36 of the coupling 18 impinges on the vanes 38, and by forcing them outwardly towards recesses 37 causes the lever arms 41 to force the push rods 42 against the inner ends of levers 28 and 28'. In this manner the longer or outer arms of the levers 28 and 28' exert a tension upon the cables 23 and 24, thereby pulling them towards the barrel 15 of the hydrant and increasing the desired pressure on the gasket or washer 21.

While specific embodiments of the invention have been shown and described in some detail in order to illustrate the application of the principles thereof, it will be understood that the invention may be otherwise embodied without departing from such principles, the scope and spirit of the invention being in conformity with the following claims.

I claim:

1. A coupling for connecting a conduit to an outlet for fluid under pressure, said coupling having a gasket for engaging the rim of said outlet, means engaging the body of said outlet for holding said coupling in position, vanes pivoted in said coupling and adapted to swing from a position in the path of the fluid through the coupling to a position clear of said path in response to velocity of said fluid, and means actuated by said swinging for tightening said holding means.

2. A coupling for connecting a conduit to an outlet for fluid under pressure, said coupling having a gasket for engaging the rim of said outlet, recesses in said coupling communicating with the bore thereof, vanes housed in said recesses and pivotally mounted therein to swing into said recess from the bore when impinged upon by said fluid, levers pivoted on said coupling and connected to said vanes, and cables passing around the body of said outlet and connected to said levers, whereby the impingement of fluid upon said vanes exerts tension upon said cables and compression of said rim upon said gasket.

3. For an outlet of fluid under pressure having a terminal rim, a coupling comprising a ring companion to the rim and comprising a duct through the ring extending through the coupling, a connection between the coupling and the outlet attachable exteriorly thereof and operable to hold the ring in position for registry with the rim, one or more vanes in the duct positioned to be actuated by fluid flowing through the coupling, and mechanism operable by actuation of the vanes to press the ring into firm seating engagement with the rim.

4. For an outlet of fluid under pressure having a terminal rim, a coupling comprising a ring companion to the rim and comprising a duct through the ring extending through the coupling, a connection between the coupling and the outlet attachable exteriorly thereof and operable to hold the ring in position for registry with the rim, one or more vanes in the duct positioned for actuation by fluid flowing through the coupling, and mechanism operable from the vanes to the connection by actuation of the vanes to tension the connection and to thereby press the ring into firm seating engagement with the rim.

5. For an outlet of fluid under pressure having a terminal rim, a coupling comprising a ring companion to the rim and comprising a duct through the ring extending through the coupling, a connection between the coupling and the outlet attachable exteriorly thereof and operable to hold the ring in position for registry with the rim, one or more vanes in the duct positioned to be actuated by fluid flowing through the coupling, mechanism operable by actuation of the vanes to press the ring into firm seating engagement with the rim, the ring being extended radially to fit various sized rims within a range of sizes.

6. For an outlet of fluid under pressure having a terminal rim, a coupling comprising a ring companion to the rim and comprising a duct through the ring extending through the coupling, a connection between the coupling and the outlet attachable exteriorly thereof and operable to hold the ring in position for registry with the rim, the connection comprising a plurality of attachments to the coupling distributed peripherally thereof, a vane companion to each attachment and positioned in the duct to be actuated by the fluid flowing through the coupling, mechanism between each vane and its companion attachment operable by actuation of the vanes to tension the connection and to thereby press the ring into firm seating engagement with the rim.

7. For an outlet of fluid under pressure having a terminal rim, a coupling comprising a ring companion to the rim and comprising a duct through the ring extending through the coupling, the ring comprising a cup-shaped surface for engagement with the rim and being extended radially to fit various sized rims within a range of sizes, a connection between the coupling and the outlet attachable exteriorly thereof and operable to hold the ring in position for registry with the rim, one or more vanes in the duct positioned to be actuated by fluid flowing through the coupling, mechanism operable by actuation of the vanes to press the ring into firm seating engagement with the rim.

8. For an outlet of fluid under pressure having a terminal rim, a coupling comprising a conical ring companion to the rim and comprising a duct through the ring extending through the coupling, a connection between the coupling and the outlet attachable exteriorly thereof and operable to hold the ring in position for registry with the rim, one or more vanes in the duct positioned to be actuated by fluid flowing through the coupling, mechanism operable by actuation of the vanes to press the ring into firm seating engagement with the rim, the ring being extended radially to fit various sized rims within a range of sizes.

9. For an outlet of fluid under pressure having a terminal rim, a coupling comprising a ring of yielding material companion to the rim and comprising a duct through the ring extending through the coupling, a connection between the coupling and the outlet attachable exteriorly thereof and operable to hold the ring in position for registry with the rim, one or more vanes in the duct positioned to be actuated by fluid flowing through the coupling, and mechanism operable by actuation of the vanes to press the ring into firm seating engagement with the rim.

10. For an outlet of fluid under pressure having a terminal rim, a coupling comprising a ring companion to the rim and comprising a duct through the ring extending through the coupling, a connection between the coupling and the outlet attachable exteriorly thereof and operable to hold the ring in position for registry with the rim, one or more vanes in the duct movable into and out of the path of the fluid, mechanism operable by movement of the vanes in the direction out of the path of the fluid to press the ring into firm seating engagement with the rim.

11. For an outlet of fluid under pressure having a terminal rim, a coupling comprising a ring companion to the rim and comprising a duct through the ring extending through the coupling, a connection between the coupling and the outlet attachable exteriorly thereof and operable to hold the ring in position for registry with the rim, one or more vanes in the duct movable into and out of the path of the fluid, mechanism operable by movement of the vanes in the direction out of the path of the fluid to press the ring into firm seating engagement with the rim, a lost-motion for the vanes operable to permit their continued movement out of the path of the fluid after they have moved to the extent required to seat the ring on the rim.

12. For an outlet of fluid under pressure having a terminal rim, a coupling comprising a ring companion to the rim and comprising a duct through the ring extending through the coupling, a connection between the coupling and the outlet attachable exteriorly thereof and operable to hold the ring in position for registry with the rim, a recess in the wall of the duct and a vane movable alternatively into the path of the fluid and into the recess, mechanism operable by actuation of the vane towards the recess to press the ring into firm seating engagement with the rim.

13. For an outlet of fluid under pressure having a terminal rim, a coupling comprising a ring companion to the rim and comprising a duct through the ring extending through the coupling, a flexible connection between the outlet and the coupling adapted to be positioned around the exterior of the outlet and operable to hold the ring in position for registry with the rim, a set of vanes in the duct positioned to be actuated by fluid flowing through the coupling, the several vanes being positioned at points in the duct transversely opposite each other, a lever mechanism for each vane disposed between it and an end of the flexible connection, the lever mechanisms being operable by actuation of the vanes to stress the flexible connection and thereby to press the ring into firm seating engagement with the rim.

14. For an outlet of fluid under pressure having a terminal rim, a coupling comprising a ring companion to the rim and comprising a duct through the ring extending through the coupling, levers pivoted on the coupling at points thereof transversely opposite each other, a flexible connection between the outlet and the coupling adapted to be positioned around the exterior of the outlet and operable to hold the ring in position for registry with the rim, an attachment for an arm of each lever with an end of the connection, a set of vanes in the duct positioned to be actuated by fluid flowing through the duct, the several vanes being respectively companion to the levers and being positioned at points in the duct transversely opposite each other, mechanism between each vane and the arm of its companion lever that is not attached to the connection, the mechanism being operable by actuation of the vanes to stress the connection and press the ring into firm seating engagement with the rim.

15. For an outlet of fluid under pressure having a terminal rim, a coupling comprising a ring companion to the rim and comprising a duct through the ring extending through the coupling, a connection between the coupling and the outlet attachable exteriorly thereof, an attachment for the connection operable to adjust its length to hold the ring in position for registry with the rim, a vane in the duct positioned to be actuated by fluid flowing through the duct, and mechanism operable by actuation of the vane to press the ring into firm seating engagement with the rim.

WILLIAM C. MacKENZIE.

REFERENCES CITED

The following references are of record in the file of this patent:

UNITED STATES PATENTS

| Number | Name | Date |
|---|---|---|
| 1,857,528 | Cantell | May 10, 1932 |
| 2,094,889 | Hooper | Oct. 5, 1937 |